United States Patent
Martin et al.

(10) Patent No.: US 11,520,599 B2
(45) Date of Patent: Dec. 6, 2022

(54) APPLICATION INTERFACE AND DATABASE STRUCTURES TO REMOTELY MANAGE BIOS SETTINGS OF AUTOMATED TELLER MACHINES

(71) Applicant: Diebold Nixdorf, Incorporated, North Canton, OH (US)

(72) Inventors: Kevin Martin, Paderborn, AL (US); Richard Brunt, Westfiled, MA (US); Shon Hostetler, Ohiopyle, PA (US); Alvin Golnik, Jr., New Port Richey, FL (US); Richard Steinmetz, St. Cloud, FL (US)

(73) Assignee: Diebold Nixdorf Incorporated, Hudson, OH (US)

( * ) Notice: Subject to any disclaimer, the term of this patent is extended or adjusted under 35 U.S.C. 154(b) by 144 days.

(21) Appl. No.: 16/964,088

(22) PCT Filed: Dec. 19, 2018

(86) PCT No.: PCT/US2018/066433
§ 371 (c)(1),
(2) Date: Jul. 22, 2020

(87) PCT Pub. No.: WO2019/147360
PCT Pub. Date: Aug. 1, 2019

(65) Prior Publication Data
US 2021/0034377 A1     Feb. 4, 2021

Related U.S. Application Data

(60) Provisional application No. 62/620,513, filed on Jan. 23, 2018.

(51) Int. Cl.
*G06F 9/4401*     (2018.01)
*G06Q 20/10*      (2012.01)

(52) U.S. Cl.
CPC ....... *G06F 9/4416* (2013.01); *G06Q 20/1085* (2013.01)

(58) Field of Classification Search
CPC .... G06F 9/4416; G06F 9/505; G06F 9/44505; G06Q 20/1085
See application file for complete search history.

(56) References Cited

U.S. PATENT DOCUMENTS

2006/0242280 A1* 10/2006 Zimmer ................. H04L 69/40
                                                      710/6
2008/0082824 A1*  4/2008 Ibrahim ................. G06F 21/72
                                                      713/172

(Continued)

FOREIGN PATENT DOCUMENTS

WO      2015065360 A1    5/2015

OTHER PUBLICATIONS

Ylian Saint-Hilaire "Using Intel® AMT serial-over-LAN to the fullest", Published Feb. 19, 2009, Updated Jan. 1, 2015 (Year: 2015).*

(Continued)

*Primary Examiner* — Kim Huynh
*Assistant Examiner* — Cory A. Latham
(74) *Attorney, Agent, or Firm* — Black McCuskey

(57) ABSTRACT

A method for controlling at least one setting of a basic input output system (BIOS) of at least one automated transaction machine (ATM) can include provisioning features of an active management technology system of a first computing device associated with an ATM. The method can also include establishing an initial trust between the first computing device and a second computing device that is remote from the first computing device, over a serial-over-lan (SOL) connection that is a feature of the active management technology system. The method can also include configuring (Continued)

the setting of the BIOS of the first computing device and storing a schedule for changing the setting of the BIOS. The method can also include reconfiguring the setting of the BIOS in response to the schedule stored on the database over the SOL.

10 Claims, 5 Drawing Sheets

(56) References Cited

U.S. PATENT DOCUMENTS

| | | | | |
|---|---|---|---|---|
| 2008/0301422 | A1* | 12/2008 | Johnson | G06F 11/2284 713/1 |
| 2013/0173897 | A1* | 7/2013 | Wang | G06F 9/4401 713/1 |
| 2015/0149412 | A1 | 5/2015 | Kobres | |
| 2019/0333038 | A1* | 10/2019 | Flett | G07F 9/006 |

OTHER PUBLICATIONS

"Intel® AMT Configuration Utility User Guide" Version 11.0, Release Date Dec. 17, 2015 (Year: 2015).*

International Searching Authority; International Search Report and Written Opinion of the International Searching Authority; dated Apr. 18, 2019.

Unknown Author; Intel Active Management Technology; Wikepedia; https://en.wikipedia.org/w/index.php?title=Intel_Active_Management_%20Technology&oldid=820120495; Date Published Unknown.

* cited by examiner

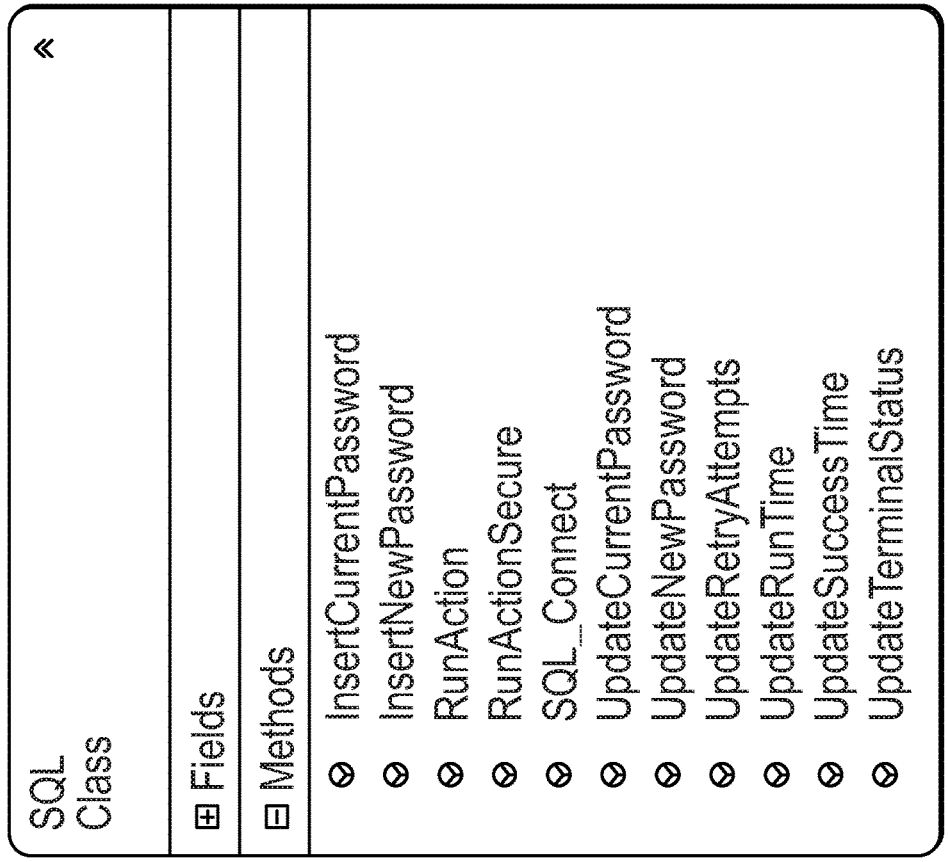
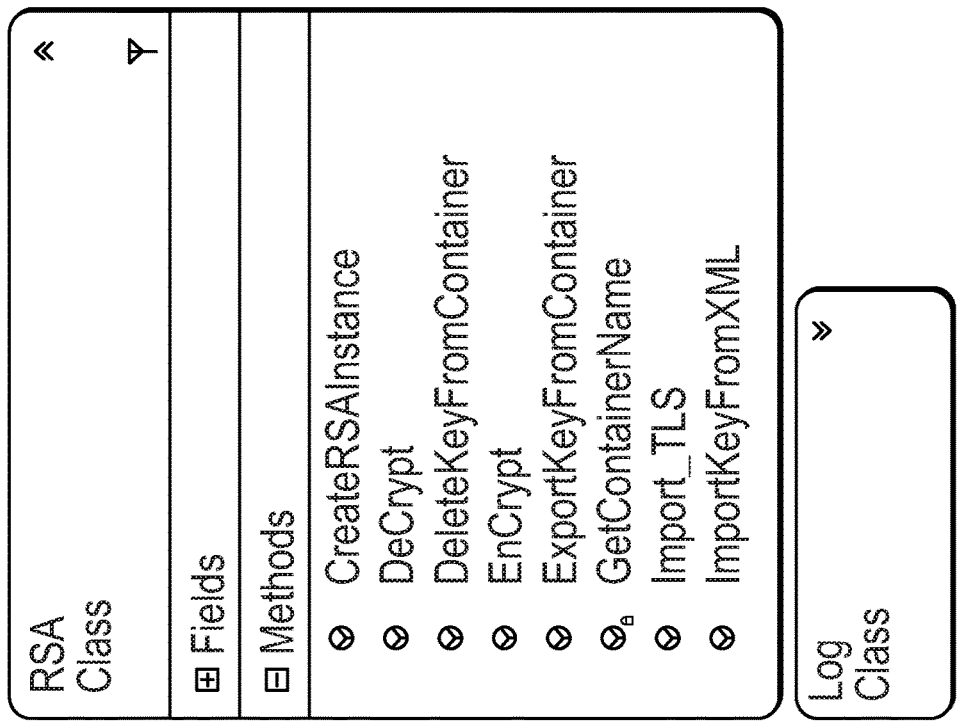
FIG. 5

APPLICATION INTERFACE AND DATABASE STRUCTURES TO REMOTELY MANAGE BIOS SETTINGS OF AUTOMATED TELLER MACHINES

CROSS-REFERENCE TO RELATED APPLICATIONS

This application claims the benefit of U.S. Provisional Patent Application Ser. No. 62/620,513 for an APPLICATION INTERFACE AND DATABASE STRUCTURES TO REMOTELY MANAGE BIOS SETTINGS OF AUTOMATED TELLER MACHINES, filed on Jan. 23, 2018, which is hereby incorporated by reference in its entirety. This application is also a National Phase filing of International Application Ser. No. PCT/US18/66433, for an APPLICATION INTERFACE AND DATABASE STRUCTURES TO REMOTELY MANAGE BIOS SETTINGS OF AUTOMATED TELLER MACHINES, filed Dec. 19, 2018.

BACKGROUND

This relates in general to automated transaction machines (ATMs) used to conduct banking transactions.

An ATM is an electronic telecommunications and computing device that enables account holders of a financial institution to perform transactions, such as cash withdrawal, check deposit and account balance inquiries, without the need for a human bank teller. The ATM includes a processor and memory. The processor executes an operating system during operation. It has been estimated that there are over three million ATMs installed throughout the world. During a transaction, the account holder identifies himself/herself by first inserting a plastic card into the ATM of a financial institution. The card contains a magnetic stripe or a chip that contains account-identification information. Secondary or "personal" authentication is then provided by the account holder by entering a personal identification number (PIN) which must match the PIN stored in the financial institution's database.

SUMMARY

A method for controlling at least one setting of a basic input output system (BIOS) of at least one ATM can include provisioning features of an active management technology system of a first computing device having one or more processors and associated with a first ATM. The method can also include establishing an initial trust between the first computing device and a second computing device having one or more processors. The second computing device can be remote from the first computing device. The establishing can occur over a serial-over-lan (SOL) connection. The SOL a feature of the active management technology system. The method can also include configuring, with the second computing device over the SOL, the at least one setting of the BIOS of the first computing device. The method can also include storing, in a database accessible by the second computing device, a schedule for changing the at least one setting of the BIOS of the first computing device. The method can also include reconfiguring, with the second computing device, the at least one setting of the BIOS of the first computing device in response to the schedule stored on the database. The reconfiguring can occur over the SOL of the active management technology system.

According to other features, the configuring can include disabling, with the second computing device, all features of the active management technology system except for the SOL. The at least one setting of the BIOS can be a boot password for the BIOS. The at least one setting of the BIOS can be a password encryption key for the BIOS.

In other features, the method can also include provisioning features of an active management technology system of a third computing device having one or more processors and associated with a second ATM. The method can also include establishing an initial trust between the third computing device and the second computing device. The third computing device can be remote from the first computing device and from the second computing device. The establishing can occur over an SOL connection defined by the active management technology system of the third computing device. The method can also include configuring, with the second computing device over the SOL of the third computing device, the at least one setting of the BIOS of the third computing device. The method can also include storing, in the database, a schedule for changing the at least one setting of the BIOS of the third computing device. The method can also include reconfiguring, with the second computing device, the at least one setting of the BIOS of the third computing device in response to the schedule for changing the at least one setting of the BIOS of the third computing device stored on the database. The reconfiguring of the third computing device can occur over the SOL of the active management technology system of the third computing device. The reconfiguring the at least one setting of the BIOS of the first computing device and the reconfiguring the at least one setting of the BIOS of the third computing device are concurrent with one another.

According to additional features, the method can also include provisioning features of an active management technology system of a third computing device having one or more processors and associated with a second ATM. The method can also include establishing an initial trust between the third computing device and the second computing device. The third computing device can be remote from the first computing device and from the second computing device. The establishing can occur through an SOL connection defined by the active management technology system of the third computing device. The method can also include establishing an initial trust between the third computing device and a fourth computing device. The third computing device can be remote from the fourth computing device. The establishing can occur over the SOL of the active management technology system of the third computing device. The method can also include configuring, with the second computing device over the SOL of the third computing device, the at least one setting of the BIOS of the third computing device. The method can also include storing, in the database, a schedule for changing the at least one setting of the BIOS of the third computing device. The method can also include reconfiguring, with the second computing device, the at least one setting of the BIOS of the third computing device in response to the schedule for changing the at least one setting of the BIOS of the third computing device stored on the database. The method can also include directing, with the second computing device, the fourth computing device to reconfigure the at least one setting of the BIOS of the third computing device. The method can also include reconfiguring, with the fourth computing device, the at least one setting of the BIOS of the third computing device in response to the directing. The reconfiguring the at least one setting of the BIOS of the third computing device with the fourth computing device occurring after the reconfiguring the at least one setting of the BIOS of the third computing device with the second computing device. The reconfiguring the at least one setting of the BIOS of the first computing device with the second computing device and the reconfiguring the at least one setting of the BIOS of the third computing device with the fourth computing device can be concurrent with one another.

A system for controlling at least one setting of a BIOS of at least one ATM can include a first computing device having one or more processors and associated with a first ATM. The first computing device having a provisioned, active management technology system. The system can also include a database. The system can also include a second computing device configured to access the database and be remote from the first computing device. The second computing device can have one or more processors and a non-transitory, computer readable medium. The readable medium can store instructions that, when executed by the one or more processors, cause the second computing device to perform operations including establishing an initial trust between the first computing device and the second computing device through an SOL connection controlled by the active management technology system of the first computing device. The readable medium can also store instructions that cause the second computing device to configure, over the SOL, the at least one setting of the BIOS of the first computing device. The readable medium can also store instructions that cause the second computing device to reconfigure the at least one setting of the BIOS of the first computing device in response to a schedule for changing the at least one setting of the BIOS of the first computing device. The schedule can be stored in the database. The reconfiguring can occur over the SOL of the active management technology system.

According to other features, the readable medium can also store instructions that cause the second computing device to disable all features of the active management technology system except for the SOL during the configuring. The at least one setting of the BIOS can be a boot password for the BIOS. The at least one setting of the BIOS can be a password encryption key for the BIOS.

In other features, the system can also include a third computing device having one or more processors and associated with a second ATM. The third computing device can have a provisioned, active management technology system and be remote from the first computing device and the second computing device. The readable medium of the second computing device can also store instructions that cause the second computing device to establish an initial trust with the third computing device through an SOL defined by the active management technology system of the third computing device. The readable medium of the second computing device can also store instructions that cause the second computing device to configure, over the SOL of the third computing device, the at least one setting of the BIOS of the third computing device. The readable medium of the second computing device can also store instructions that cause the second computing device to reconfigure the at least one setting of the BIOS of the third computing device in response to the schedule for changing the at least one setting of the BIOS of the third computing device stored in the database. The reconfiguring of the third computing device can occur over the SOL of the active management technology system of the third computing device. The reconfiguring the at least one setting of the BIOS of the first computing device and the reconfiguring the at least one setting of the BIOS of the third computing device are concurrent with one another.

According to additional features, the system can also include a third computing device having one or more processors and associated with a second ATM. The third computing device can have a provisioned, active management technology system and be remote from the first computing device and the second computing device. The system can also include a fourth computing device configured to access the database and be remote from the third computing device. The fourth computing device can have one or more processors and a non-transitory, computer readable medium. The readable medium of the second computing device can also store instructions that cause the second computing device to establish an initial trust with the third computing device through an SOL defined by the active management technology system of the third computing device. The readable medium of the second computing device can also store instructions that cause the second computing device to store, in the database, a schedule for changing the at least one setting of the BIOS of the third computing device. The readable medium of the second computing device can also store instructions that cause the second computing device to configure, over the SOL of the third computing device, the at least one setting of the BIOS of the third computing device. The readable medium of the fourth computing device can store instructions that cause the fourth computing device to establish an initial trust between the third computing device and a fourth computing device. The third computing device can be remote from the fourth computing device. The establishing can occur over the SOL of the active management technology system of the third computing device. The readable medium of the second computing device can also store instructions that cause the second computing device to reconfigure the at least one setting of the BIOS of the third computing device in response to the schedule for changing the at least one setting of the BIOS of the third computing device stored in the database. The readable medium of the second computing device can also store instructions that cause the second computing device to direct the fourth computing device to reconfigure the at least one setting of the BIOS of the third computing device. The readable medium of the fourth computing device can also store instructions that cause the fourth computing device to reconfigure the at least one setting of the BIOS of the third computing device in response to the directing from the second computing device. The reconfiguring of the at least one setting of the BIOS of the third computing device with the fourth computing device can occur after the reconfiguring of the at least one setting of the BIOS of the third computing device by the second computing device. The reconfiguring the at least one setting of the BIOS of the first computing device with the second computing device and the reconfiguring the at least one setting of the BIOS of the third computing device with the fourth computing device can be concurrent with one another.

Various aspects will become apparent to those skilled in the art from the following detailed description and the accompanying drawings.

BRIEF DESCRIPTION OF THE DRAWINGS

FIG. 5 is a functional block diagram of the options that can be available in an application interface in one or more implementations of the present disclosure.

DETAILED DESCRIPTION

Figure 1:
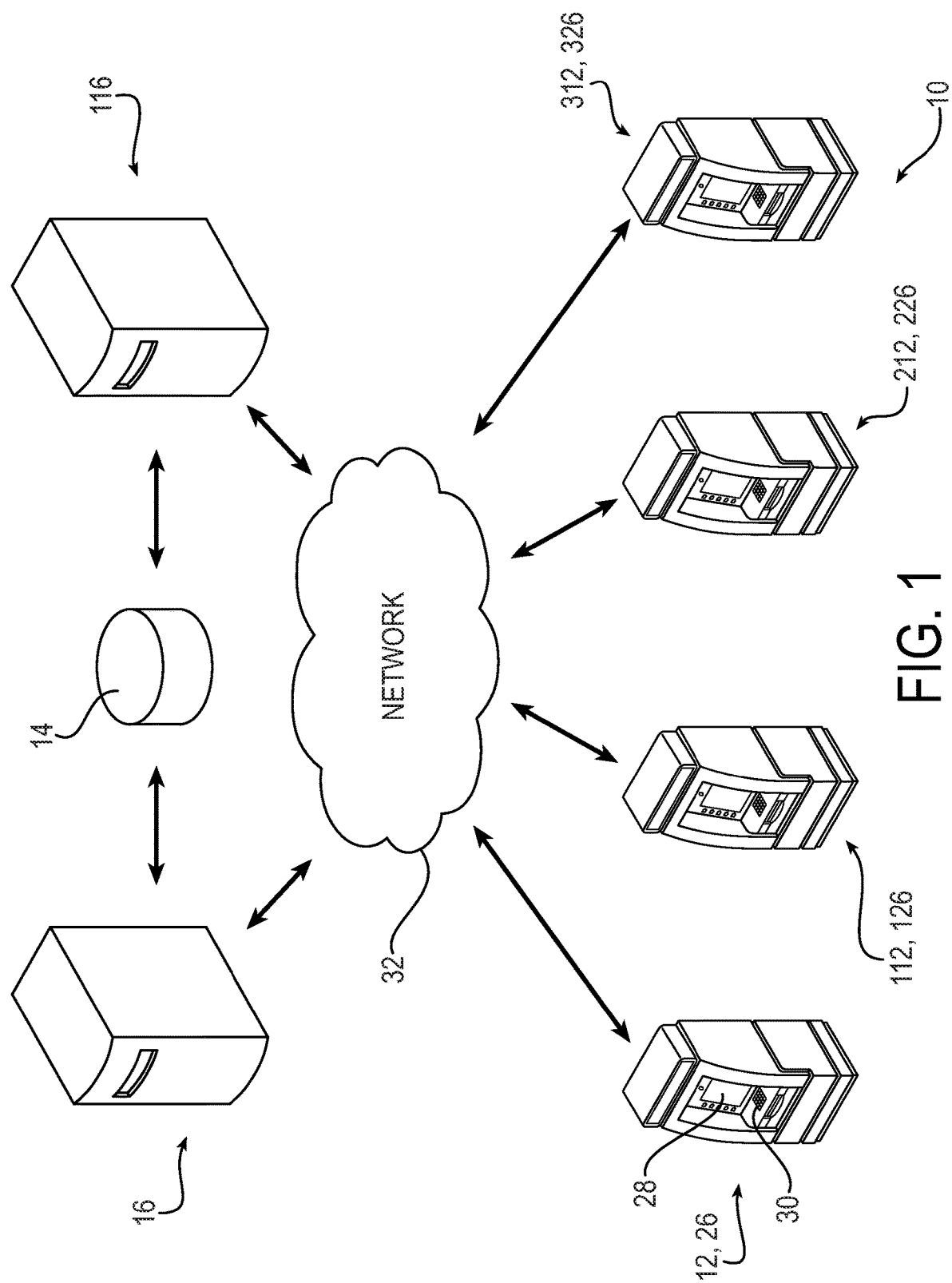
FIG. 1 is a functional block diagram of an exemplary system according to one or more implementations of the present disclosure.

It is noted that similar features are disclosed in the present disclosure. Similar features have been numbered with a common two-digit reference numeral and have been differentiated by a third digit prefix placed before the two common digits. Similar features are structured similarly, operate similarly, and/or have the same function unless otherwise indicated by the drawings or this specification.

Referring now to FIG. 1, a system 10 can include at least one first computing device 12, a database 14, and at least one second computing device 16. As shown schematically in FIG. 2, the exemplary first computing device 12 has one or more processors 18, a computer readable medium (memory) 20 for storing instructions and data, an active management technology system 22, and a BIOS 24. Referring again to FIG. 1, the exemplary first computing device 12 is associated with a first ATM 26. The first ATM 26 includes a display screen 28 and a key pad 30. The first ATM 26 can be operated by a user to complete a banking transaction such as a deposit or a withdrawal. The exemplary system 10 includes a plurality of first computing devices 12, 112, 212, 312, each associated with a respective ATM 26, 126, 226, 326.

Figure 2:
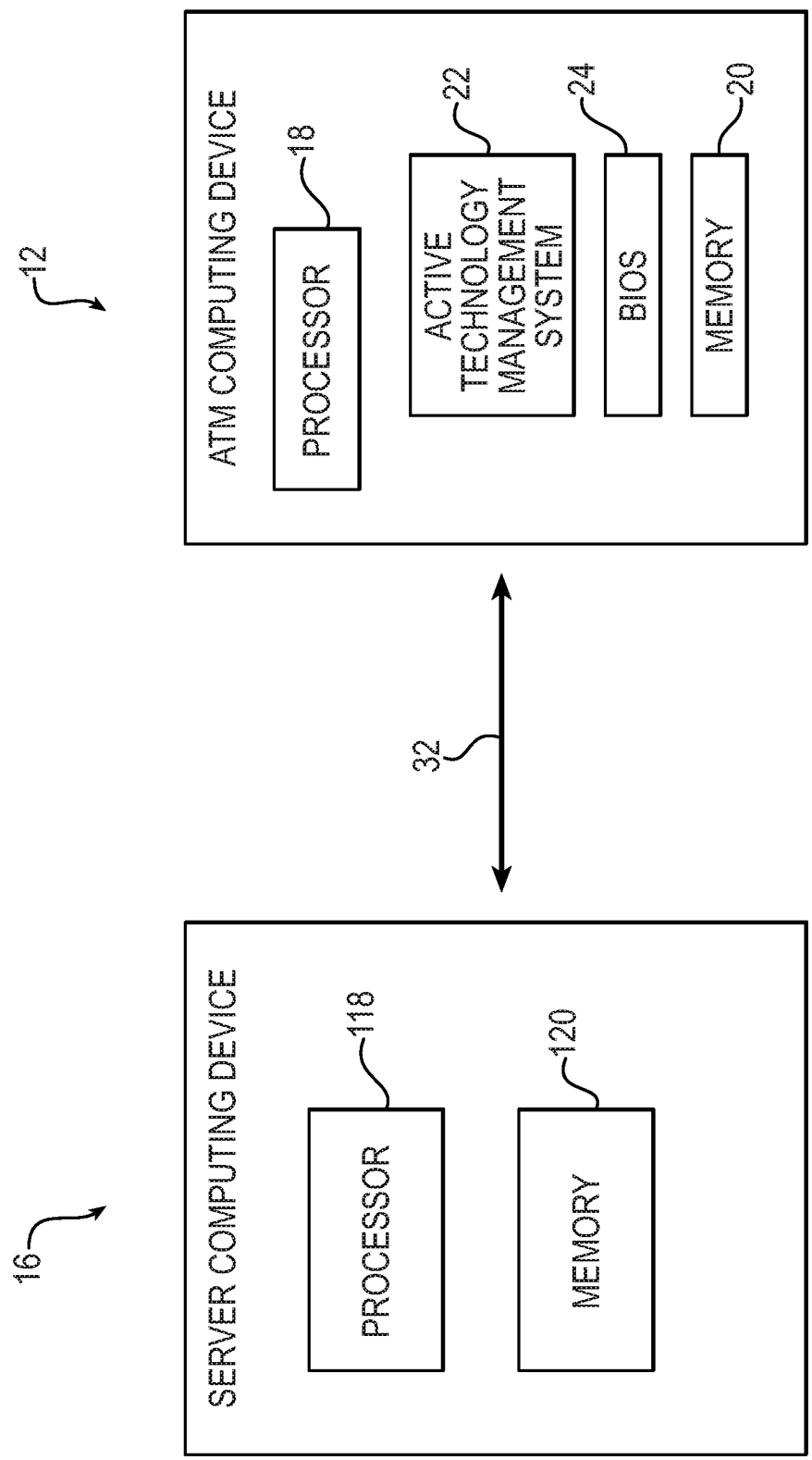
FIG. 2 is a functional block diagram of exemplary computing devices according to one or more implementations of the present disclosure.

As shown schematically in FIG. 2, the exemplary second computing device 16 has one or more processors 118 and a computer readable medium (memory) 120 for storing instructions and data. The exemplary second computing device 16 is a server computing device remote from the first computing device 12. The exemplary second computing device 16 is configured to access the database 14 and the first computing device 12. In the exemplary disclosure, the second computing device 16 can directly access the database 14 and accesses the first computing device 12 over a network 32, as shown in FIG. 1. The network 32 can include a local area network (LAN), a wide area network (WAN), e.g., the Internet, or a combination thereof. The present disclosure is well suited to a wide variety of computer network systems over numerous topologies. The exemplary system 10 includes a plurality of second computing devices 16, 116. The second computing devices 16, 116 can communicate with one another directly or over the network 32.

The processors 18, 118 can be configured to control operation of the respective computing devices 12, 16. It should be appreciated that the term "processor" as used herein can refer to both a single processor and two or more processors operating in a parallel or distributed architecture. The processors 18, 118 can respectively operate under the control of an operating system, kernel and/or firmware and can execute or otherwise rely upon various computer software applications, components, programs, objects, modules, data structures, etc. The processors 18, 118 can each be configured to perform general functions including, but not limited to, loading/executing an operating system of the respective computing devices 12, 16, controlling communications, and controlling read/write operations to the respective memory 20, 120.

Each memory 20, 120 can be defined in various ways in implementations of the present disclosure. Each memory 20, 120 can include computer readable storage media and communication media. Each memory 20, 120 can be non-transitory in nature, and may include volatile and non-volatile, and removable and non-removable media implemented in any method or technology for storage of information, such as computer-readable instructions, data structures, program modules or other data. Each memory 20, 120 can further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the respective processor 18, 118. Each memory 20, 120 can store computer readable instructions, data structures or other program modules.

The active management technology system 22 allows for remote, out-of-band (OOB) management of the first computing device 12. The active management technology system 22 uses an OOB communication channel that operates regardless of the state of the operating system of the first computing device 12. The active management technology system 22 can be utilized to remotely power-up the first computing device 12.

The system 10 is for controlling at least one setting of the BIOS 24 of the first computing device 12. For example, "controlling" can include changing the at least one setting. The exemplary system 10 is operable to control settings of the BIOS of all of the first computing devices 12, 112, 212, 312. Each of the exemplary second computing devices 16, 116 can access the BIOS of any of the first computing devices 12, 112, 212, 312.

Figure 3:
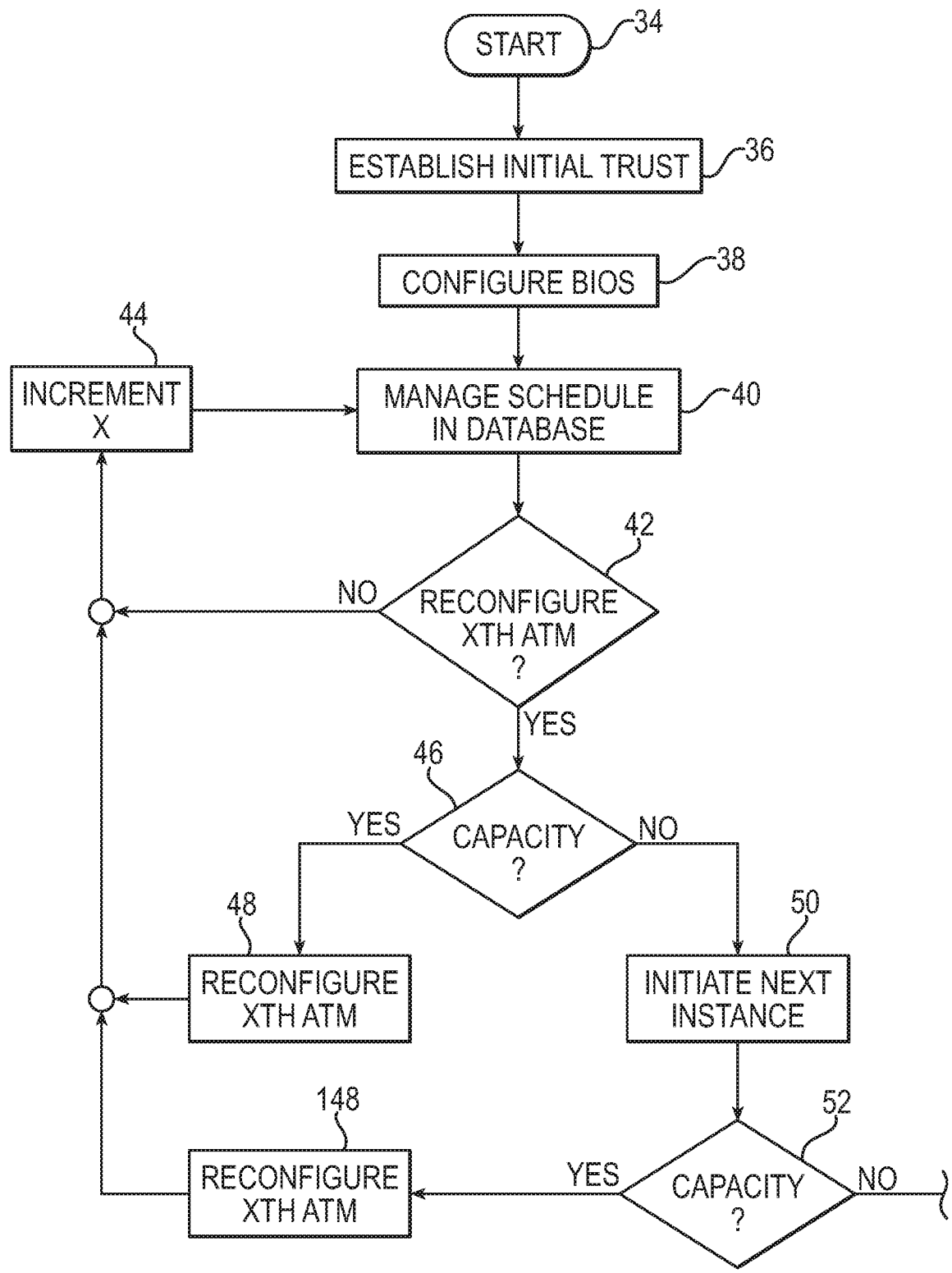
FIG. 3 is a flow diagram of an exemplary method executed by a system according to one or more implementations of the present disclosure.

A method for controlling at least one setting of the BIOS 24 of the first computing device 12 is illustrated in FIG. 3. Starting at 34, the active management technology system 22 of the first computing device 12 is provisioned. The active management technology system 22 of the first computing device 12 can be provisioned by the second computing device 16, wherein the second computing device 16 would be executing operations in response to instructions stored on memory 118.

Provisioning can include, at 36, establishing an initial trust between the first computing device 12 and the second computing device 16. Establishing 36 can be viewed as a setup phase for the active management technology system 22. The establishing 36 can occur over a serial-over-lan (SOL) connection that is a feature of the active management technology system 22. The establishing 36 includes implementing an initial trust between the automation framework of the BIOS 24 (automation executed by the second computing device 16) and the active management technology system 22. Also, during the establishing 36, initial administrative credentials and basic network parameters are set. The establishing 36 creates well-defined and role-based access control privileges for automating the setting and changing of one or more aspects of the BIOS 24. Transport Layer Security (TLS) certificates can also be setup during the establishing 36.

Provisioning can also include, at 38, configuring, with the second computing device 16 over the SOL, at least one setting of the BIOS 24 of the first computing device 12. The configuring 38 can include setting parameters of advanced networking. The definition of the access control list (ACL)

of the active management technology system 22 can be set during the configuring 38 as well. The ACL defines user roles and the respective levels of access each user has to the capabilities within the active management technology system 22. The configuring 38 can also include defining user privacy policies and setting parameters for other features.

The administrative account of the active management technology system 22 can be disabled during provisioning. All of the features of the active management technology system 22 except for the SOL can be disabled during provisioning. Thus, the administrative account may never be used again after provisioning and only named accounts can be used after provisioning. In the exemplary embodiment, the administrative account of the active management technology system 22 is never used again, after initial provisioning, in order to enhance security.

In one or more embodiments of the present disclosure, the provisioning (including the establishing 36 and the configuring 38) can be carried out over a secure TLS connection via managed certificates. The TLS protocol reduces the risk of man-in-the-middle attacks by providing communication security and privacy between two endpoints. As set forth above, it can also be desirable during provisioning 34 to reduce the privileges of the default admin account of the active management technology system 22. After provisioning 34, the management engine interface (MEI) drivers can be uninstalled from the operating system of the ATM 26.

At 40, a schedule for changing at least one setting of the BIOS 24 of the first computing device 12 can be stored in the database 14. The second computing device 16 can access the database 14 and read the schedule. The schedule can be determined as desired. The schedule can be implemented and changed (or managed) as desired. For example, the at least one setting of the BIOS 24 of the first computing device 12 can be changed weekly, monthly, or on some other constant or variable interval.

The second computing device 16 can monitor the schedule stored in the database 14, as referenced at 42. The reference to the "Xth" ATM in FIG. 3 refers to one or more embodiments of the present disclosure in which more than one ATM is being managed by the second computing device 16. When the schedule does not indicate that the Xth or presently-considered ATM is due for reconfiguring, the method continues to 44 and the second computing device 16 reads the schedule for the next ATM being managed.

When the schedule indicates that the present ATM is due for reconfiguring, the exemplary method continues to 46 and the second computing device 16 determines if it has the processing capacity to reconfigure the BIOS 24 of the present ATM. In one or more embodiments of the present disclosure, the second computing device 16 can execute multiple threads of reconfiguring at one time. The second computing device 16 can have established a trust with another first computing device, such as any of the first computing devices 112, 212, or 312. The respective schedules for the first computing devices 112, 212, 312 can be stored in the database 14 and accessed by the second computing device 16. The reconfiguring of the at least one setting of the BIOS 24 of more than one first computing device can be completed concurrently by the second computing device 16.

When the second computing device 16 has the capacity to reconfigure the BIOS 24 of the present ATM, the exemplary method proceeds from 46 to 48 and the second computing device 16 proceeds with reconfiguring. In reconfiguring, the second computing device 16 can change at least one setting of the BIOS 24 of the first computing device 12 in response to the schedule stored on the database 14. The reconfiguring can occur over the SOL of the active management technology system 22. In one example, the password of the default administrative account of the BIOS 24 can be changed to a very strong, random password. The password of each ATM computing device can be unique and can have the maximum password length. In another example, the reconfiguring can include changing a password encryption key for the BIOS 24. In another example, the at least one setting of the BIOS 24 that is changed during the reconfiguring can be the boot password for the BIOS 24. It is noted that while passwords are set forth above as examples of BIOS settings that are managed, the present disclosure can apply to manage any of the BIOS settings, including, for example, the default boot media and partition schemes.

When the second computing device 16 does not have the capacity to reconfigure the BIOS 24 of the present ATM, the exemplary method proceeds from 46 to 50 and another instance of the method is initiated. In one or more embodiments of the present disclosure, the method can be executed on more than one second computing device, such as devices 16 and 116, at one time. Each instance/device such as 16, 116 and others can execute multiple threads of reconfiguring. Trust can be established between each of the respective devices 16, 116 and the devices 12, 112, 212, 312 so that either second computing device 16 or 116 can reconfigure any of the devices 12, 112, 212, 312. For example, the second computing device 16 can be reconfiguring the devices 12, 112, and 212 and direct the device 116 to reconfigure the device 312.

At 52, the second computing device 116 determines if it has the processing capacity to reconfigure the BIOS 24 of the present ATM. When the second computing device 116 has the capacity to reconfigure the BIOS 24 of the present ATM, the exemplary method continues to 148 and the second computing device 116 proceeds with reconfiguring. When the second computing device 116 does not have the capacity to reconfigure the BIOS 24 of the present ATM, the exemplary method proceeds from 52 to initiate another instance of the method. While not shown, actions similar to 50, 52, and 148 would follow the "NO" branch of query 52.

Figure 4:
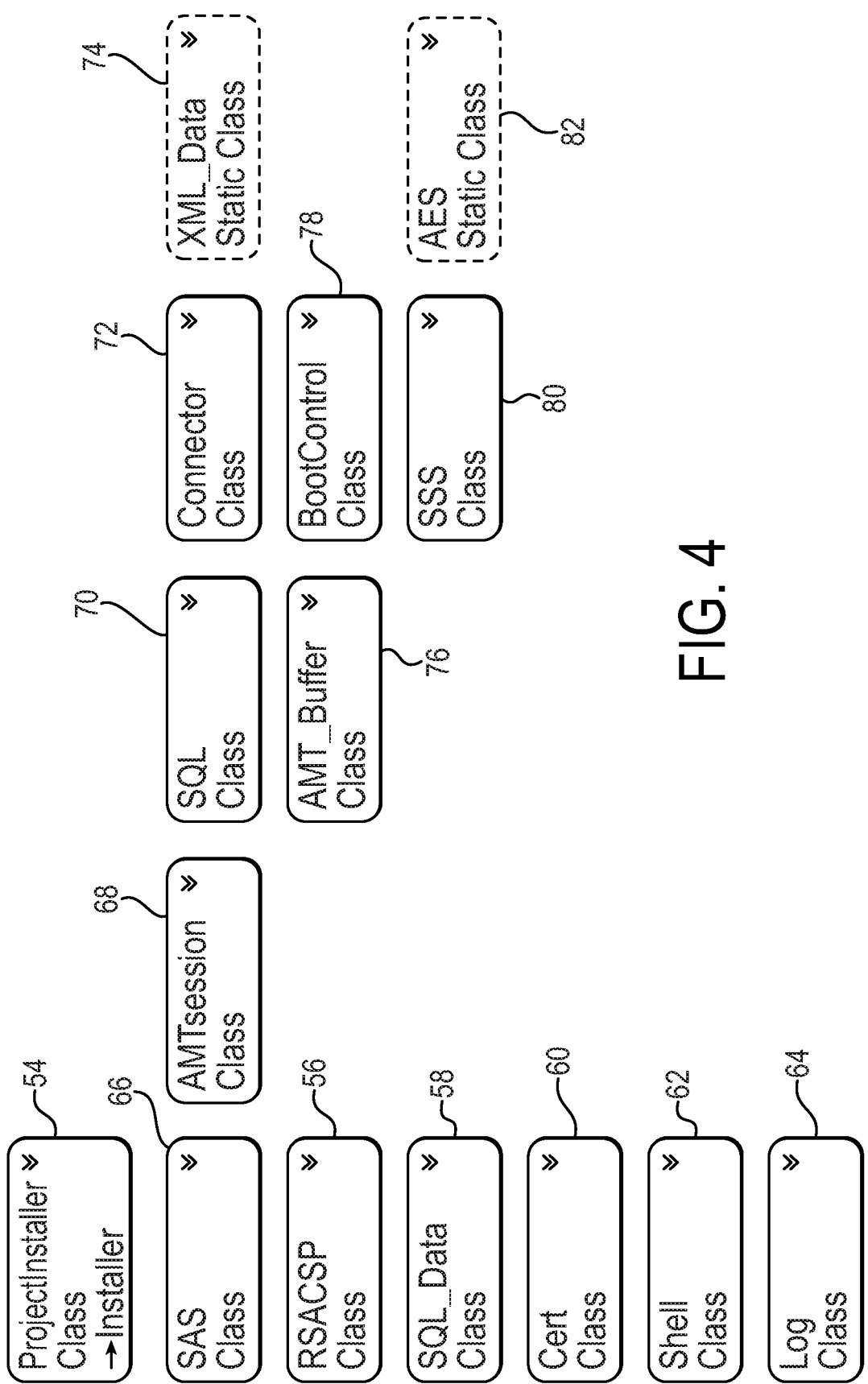
FIG. 4 is a functional block diagram of the functions that can be applied in one or more implementations of the present disclosure.

FIGS. 4 and 5 disclose functional block diagrams associated with one or more implementations of the present disclosure. FIG. 4 is a functional block diagram of functions of an exemplary SOL Automation Service (SAS) that can be applied in one or more implementations of the present disclosure. The primary function of the SAS was described above and shown in FIG. 3. FIG. 5 is a functional block diagram of the options that can be available in an application interface (API) in one or more implementations of the present disclosure.

Referring now to FIG. 4, the block 54 is designated ProjectInstaller. This is a service class with shell install/uninstall function for a Microsoft® Windows® managed service installation and removal. The block 56 is designated RSACSP. This is an RSA encryption class for secure password storage. The block 58 is designated SQL_Data. This is a database interface class. The block 60 is designated Cert. This is a certificate management class utilizing a machine key store. The block 62 is designated Shell. This refers to a command line shell class which allows the SAS to operate as a desktop shell application or a service. The block 64 is designated Log. This is an application log class.

The block 66 is designated SAS and represents the core class, containing SAS features. The block 68 is designated AMTsession. This is a class for managing each thread of reconfiguring a BIOS of an ATM device. The "AMT" is a reference to the use of the active management technology system 22 for reconfiguring. The block 70 is designated SOL. This is an interface class for Serial-Over-Lan functionality utilized when reconfiguring. The block 72 is designated Connector. This is a connector interface class for the BIOS automation. The block 74 is designated XML_Data. This is a class for BIOS action processing and automation. The block 76 is designated AMT_Buffer. This is a BIOS data packet retrieval class. The block 78 is designated BootControl. This is a BIOS boot control automation class. The block 80 is designated SSS. This is a safe shutdown service class for safe shutdown of the remote ATM device. The block 82 is designated AES. This is class for secure command delivery to complete the safe shutdown service.

Referring now to FIG. 5, an administrator of the system 10 can utilize an API to manage, update, modify, and monitor the SAS. Exemplary menus available to the administrator are shown in FIG. 5. A pull down menu is referenced at 84 and is designated RSA. The pull down menu 84 presents various options to the administrator related to the management of encryption keys. Option "CreateRSAInstance" can be selected to initiate a function in which a machine specific key pair is generated. This key pair can be stored in the local machine key store. Option "EnCrypt" can be selected to initiate a function in which a password string is encrypted. Option "DeCrypt" can be selected to initiate a function in which a password string previously encrypted with EnCrypt function is decrypted. Option "DeleteKeyFromContainer" can be selected to initiate a function in which a key is deleted. Option "ExportKeyFromContainer" can be selected to initiate a function in which a private or public key from the machine key store is exported. Option "GetContainerName" can be selected to initiate a function in which a name of a key container is obtained. Option "Import_TLS" can be selected to initiate a function in which a TLS certificate is imported into a local system certificate store. Option "ImportKeyFromXML" can be selected to initiate a function in which an RSA key pair is imported from an XML file.

Another exemplary pull down menu is referenced at 86 and is designated SQL. This refers to a database API class. Option "InsertCurrentPassword" can be selected to initiate a function in which a current password for a specific ATM in the system 10 is created. Option "InsertNewPassword" can be selected to initiate a function in which a new password is created for a specific ATM in the system 10. Option "RunAction" can be selected to initiate a function in which a specified action group is scheduled to run using unencrypted password strings. Option "RunActionSecure" can be selected to initiate a function in which a specified action group is scheduled to run using encrypted password strings. Option "SQL_Connect" can be selected to connect to a given, named SQL database service instance. Option "UpdateCurrentPassword" can be selected to initiate a function in which an existing current password for a given ATM is updated. Option "UpdateNewPassword" can be selected to initiate a function in which an existing new password for a given ATM is updated. Option "UpdateRetryAttempts" can be selected to initiate a function in which retry attempts for a given ATM and action group is updated. Option "UpdateRunTime" can be selected to initiate a function in which run time date/time values for a given ATM and action group are updated. Option "UpdateSuccessTime" can be selected to initiate a function in which a time value for a given ATM and action group is updated; the time value is the time that reconfiguring is complete. Option "UpdateTerminalStatus" can be selected to initiate a function in which a terminal "successful action" flag is updated.

A pull down menu is referenced at 88 and is designated LOG. This refers corresponds to the application log class 64 shown in FIG. 4.

Working embodiments of the present disclosure have been implemented and proofs of concept have been confirmed in multiple, different operating environments. The present disclosure provides a system and method that can concurrently manage all ATMs (1 to N), easing the burden on a financial institution since direct management by a human (1 to 1) is replaced. Further, the system and method of the present disclosure ensures that a consistent and universal approach is applied in implementing BIOS changes. Further, the system and method of the present disclosure imparts new functionality in the management of ATMs. In addition, the system and method of the present disclosure enhances the security of ATMs. Specifically, human operators and field service technicians can be omitted from changing BIOS settings. Also, the system and method of the present disclosure allows for increasing the frequency of BIOS changes, which itself enhances the security of ATMs. The system and method of the present disclosure can also can set, change or evaluate any BIOS setting over many connections via out of band channels. The system and method of the present disclosure is also vendor agnostic with out of band capable cores. The system and method of the present disclosure can also be designed with a complex one to many automation architecture via out of band channels. The system and method of the present disclosure can also support a robust action processing engine which allows any BIOS setting to be automated. The system and method of the present disclosure can also generate, enforce and manage password complexity meeting PCI requirements, allowing for the system/software to manage BIOS passwords without backend or field operators knowing any passwords. The system and method of the present disclosure can also manage Out of Band, Boot and BIOS passwords via scheduled actions. The system and method of the present disclosure can also can manage a unique password for every terminal not known by an operator. The system and method of the present disclosure can also support launching multiple out of band KVM and AMT event/control sessions.

While principles and modes of operation have been explained and illustrated with regard to particular embodiments, it must be understood, however, that this may be practiced otherwise than as specifically explained and illustrated without departing from its spirit or scope.

What is claimed is:

1. A method for controlling at least one setting of a basic input output system (BIOS) of at least one automated transaction machine (ATM) comprising:
provisioning features of an active management technology system of a first computing device having one or more processors and associated with a first ATM, including:
establishing an initial trust between the first computing device and a second computing device having one or more processors, the second computing device remote from the first computing device, said establishing occurring over a serial-over-lan (SOL) connection, the SOL a feature of the active management technology system, and
configuring, with the second computing device over the SOL, the at least one setting of the BIOS of the first computing device;

storing, in a database accessible by the second computing device, a schedule for changing the at least one setting of the BIOS of the first computing device;

reconfiguring, with the second computing device, the at least one setting of the BIOS of the first computing device in response to the schedule stored on the database, said reconfiguring over the SOL of the active management technology system;

provisioning features of an active management technology system of a third computing device having one or more processors and associated with a second ATM, including:

establishing an initial trust between the third computing device and the second computing device, the third computing device remote from the first computing device and from the second computing device, said establishing occurring over an SOL connection defined by the active management technology system of the third computing device, establishing an initial trust between the third computing device and a fourth computing device, the third computing device remote from the fourth computing device, said establishing further defined as occurring over the SOL of the active management technology system of the third computing device, and configuring, with the second computing device over the SOL of the third computing device, the at least one setting of the BIOS of the third computing device;

storing, in the database, a schedule for changing the at least one setting of the BIOS of the third computing device;

reconfiguring, with the second computing device, the at least one setting of the BIOS of the third computing device in response to the schedule for changing the at least one setting of the BIOS of the third computing device stored on the database;

directing, with the second computing device, the fourth computing device to reconfigure the at least one setting of the BIOS of the third computing device; and reconfiguring, with the fourth computing device, the at least one setting of the BIOS of the third computing device in response to said directing, said reconfiguring the at least one setting of the BIOS of the third computing device with the fourth computing device occurring after said reconfiguring the at least one setting of the BIOS of the third computing device with the second computing device.

2. The method of claim 1 wherein said configuring further comprises:
disabling, with the second computing device, all features of the active management technology system except for the SOL.

3. The method of claim 1 wherein the at least one setting of the BIOS is further defined as a boot password for the BIOS.

4. The method of claim 1 wherein the at least one setting of the BIOS is further defined as a password encryption key for the BIOS.

5. The method of claim 1 wherein said reconfiguring the at least one setting of the BIOS of the first computing device with the second computing device and said reconfiguring the at least one setting of the BIOS of the third computing device with the fourth computing device are concurrent with one another.

6. A system for controlling at least one setting of a basic input output system (BIOS) of at least one automated transaction machine (ATM) comprising:

a first computing device having one or more processors and associated with a first ATM, the first computing device having a provisioned, active management technology system;

a database;

a second computing device configured to access said database and remote from the first computing device, said second computing device having one or more processors and a non-transitory, computer readable medium storing instructions that, when executed by the one or more processors, cause said second computing device to perform operations comprising:

establishing an initial trust between the first computing device and the second computing device over a serial-over-lan (SOL) connection controlled by the active management technology system of the first computing device, configuring, over the SOL, the at least one setting of the BIOS of the first computing device, and reconfiguring the at least one setting of the BIOS of the first computing device in response to a schedule for changing the at least one setting of the BIOS of the first computing device, the schedule stored in the database, said reconfiguring occurring over the SOL of the active management technology system;

a third computing device having one or more processors and associated with a second ATM, the third computing device having a provisioned, active management technology system and remote from the first computing device and the second computing device;

a fourth computing device configured to access said database and remote from the third computing device, said fourth computing device having one or more processors and a non-transitory, computer readable medium;

wherein said non-transitory, computer readable medium of the second computing device further causes the second computing device to perform operations comprising:

establishing an initial trust with the third computing device through an SOL defined by the active management technology system of the third computing device, storing, in the database, a schedule for changing the at least one setting of the BIOS of the third computing device, and configuring, over said SOL of the third computing device, the at least one setting of the BIOS of the third computing device;

wherein said non-transitory, computer readable medium of the fourth computing device further causes the fourth computing device to perform operations comprising:

establishing an initial trust between the third computing device and a fourth computing device, the third computing device remote from the fourth computing device, said establishing further defined as occurring through the SOL of the active management technology system of the third computing device wherein said non-transitory, computer readable medium of the second computing device further causes the second computing device to perform operations comprising:

reconfiguring the at least one setting of the BIOS of the third computing device in response to the schedule for changing the at least one setting of the BIOS of the third computing device stored in the database;

wherein said non-transitory, computer readable medium of the second computing device further causes the second computing device to perform operations comprising directing the fourth computing device to reconfigure the at least one setting of the BIOS of the third computing device; and wherein said non-transitory, computer readable medium of the fourth computing device further causes the fourth computing device to perform operations comprising reconfiguring the at least one setting of the BIOS of the third computing device in response to said directing from the second computing device, the reconfiguring of the at least one setting of the BIOS of the third computing device by the fourth computing device occurring after the reconfiguring of the at least one setting of the BIOS of the third computing device by the second computing device.

7. The system of claim 6 wherein said non-transitory, computer readable medium storing instructions further causes the second computing device to perform an operation comprising:

disabling all features of the active management technology system except for the SOL during the configuring.

8. The system of claim 6 wherein the at least one setting of the BIOS is further defined as a boot password for the BIOS.

9. The system of claim 6 wherein the at least one setting of the BIOS is further defined as a password encryption key for the BIOS.

10. The system of claim 6 wherein said reconfiguring the at least one setting of the BIOS of the first computing device with the second computing device and said reconfiguring the at least one setting of the BIOS of the third computing device with the fourth computing device are concurrent with one another.

* * * * *

UNITED STATES PATENT AND TRADEMARK OFFICE
CERTIFICATE OF CORRECTION

| | | |
|---|---|---|
| PATENT NO. | : 11,520,599 B2 | Page 1 of 1 |
| APPLICATION NO. | : 16/964088 | |
| DATED | : December 6, 2022 | |
| INVENTOR(S) | : Kevin Martin et al. | |

It is certified that error appears in the above-identified patent and that said Letters Patent is hereby corrected as shown below:

On the Title Page

In the Inventors item (72), Line 1, delete "Paderborn" and insert -- Rainbow City --.

Signed and Sealed this
Twenty-third Day of May, 2023

Katherine Kelly Vidal
*Director of the United States Patent and Trademark Office*